(12) United States Patent
Park et al.

(10) Patent No.: US 9,527,436 B2
(45) Date of Patent: Dec. 27, 2016

(54) PLANAR LIGHTING MIRROR AND AUTOMOBILE SIDE MIRROR SYSTEM

(71) Applicants: Hyundai Motor Company, Seoul (KR); SEP INC, Anyang, Gyeonggi-Do (KR)

(72) Inventors: Sungjune Park, Daijeon (KR); Sang Young Kim, Hwaseong (KR); Sang Ro Lee, Anyang (KR); Yun Hwan Kim, Seoul (KR); Jae Hyung Seo, Busan (KR)

(73) Assignees: Hyundai Motor Company, Seoul (KR); SEP INC, Anyang, Gyeonggi-do (KR)

( * ) Notice: Subject to any disclaimer, the term of this patent is extended or adjusted under 35 U.S.C. 154(b) by 78 days.

(21) Appl. No.: 14/569,743

(22) Filed: Dec. 14, 2014

(65) Prior Publication Data

US 2015/0266412 A1   Sep. 24, 2015

(30) Foreign Application Priority Data

Mar. 20, 2014   (KR) .................. 10-2014-0032737

(51) Int. Cl.
*B60Q 1/26*   (2006.01)
*B60R 1/12*   (2006.01)

(52) U.S. Cl.
CPC ............... *B60Q 1/2665* (2013.01); *B60R 1/12* (2013.01); *B60R 2001/1215* (2013.01)

(58) Field of Classification Search
CPC ....... B60Q 1/2665; B60Q 3/002; B60Q 3/004; B60Q 3/023; B60R 2001/1215; B60R 1/12; B60R 1/1207; B60R 1/08; G02B 6/0035; G02B 5/08; G02B 5/085; F21V 7/10; F21V 7/22

See application file for complete search history.

(56) References Cited

U.S. PATENT DOCUMENTS 7,049,945 B2 *  5/2006  Breed ................... B60Q 9/008
                                              340/435
8,186,865 B2 *  5/2012  Wei ..................... G02B 6/0043
                                              349/62
8,477,044 B2 *  7/2013  Wagner ............... B60Q 1/2665
                                              340/815.4

FOREIGN PATENT DOCUMENTS

| JP | 2011-238566 A | 11/2011 |
| KR | 10-2006-0049783 A | 5/2006 |
| KR | 10-2011-0014430 A | 2/2011 |
| KR | 2011-0019405 A | 2/2011 |
| KR | 2012-0057849 A | 6/2012 |
| KR | 10-1217783 B1 | 1/2013 |
| KR | 20-2013-0003285 U | 6/2013 |
| WO | 2011/113208 A1 | 9/2011 |

* cited by examiner

*Primary Examiner* — Bao Q Truong
(74) *Attorney, Agent, or Firm* — Mintz Levin Cohn Ferris Glovsky and Popeo, P.C.; Peter F. Corless

(57) ABSTRACT

A planar lighting mirror in which nano-patterns are formed on an entirety or at a specific local area of a mirror surface of a mirror glass and a light source is disposed around the nano-patterns to be used like a mirror in normal operation. In particular, when the light source is activated, the entirety or the specific local area of the mirror surface with the nano-patterns formed thereon planarly emits light from the light source which flows into the side of the mirror glass so as not to deteriorate a mirrors reflective functions.

9 Claims, 3 Drawing Sheets

PLANAR LIGHTING MIRROR AND AUTOMOBILE SIDE MIRROR SYSTEM

CROSS-REFERENCE TO RELATED APPLICATION

This application claims under 35 U.S.C. §119(a) the benefit of Korean Patent Application No. 10-2014-0032737 filed Mar. 20, 2014, the entire contents of which are incorporated herein by reference.

BACKGROUND (a) Technical Field

The present disclosure relates to a planar lighting mirror. More particularly, it relates to a planar lighting mirror with nano-patterns formed on the glass for the mirror that enables only a part with the nano-patterns to emit light when light is irradiated.

(b) Background Art

In general, planar lighting technology is applied to a backlight unit (BLU) of an LCD to make lighting to occur on an entire surface while light incident on the side of a light guide plate is vertically refracted by a micro-protrusion or a dimple of the backlight unit with respect to the incident light.

Recently, technology that enables various colors and images to be implemented as necessary while still providing a transparent glass without deterioration of transmittance of visible-rays has been developed. As a result, manufactures have attempted to apply this technology to advertisement windows in which information or images are provided within the glass of the window. For example, Korean Patent Registration No. 10-1217783 (Jan. 2, 2013) discloses a method that can control water repellency, oil repellency, an optical transparence, and the like by forming nano-patterns on the surface of a substrate while being applied to glass of an automobile.

Meanwhile, in order to detect when a vehicle, an object, or human is present in a driver's blind spot of the automobile (to increase driving safety), automobile manufactures have begun implementing systems that detects the presence of the vehicle, the object, or the human and notify the occupants of the vehicle of the presence of the vehicle, the object, or the human to a driver.

To this end, in one example, a specific mark may be made to flash or flicker when the vehicle and the like are present in the blind spot by mounting the flickerable specific mark on the surface or a body part of a side mirror. This allows the driver to be notified that the vehicle and the like are present in the blind spot, thereby achieving safer driving environments.

In this case, the specific mark engraved on the side mirror should not distinguished from other parts (mirror surface) of the side mirror when other vehicles are not in the blind spot, and lighting intensity of the specific mark of the side mirror needs to be bright enough for only a driver of the vehicle in which it is installed to identify.

However, in the related art for implementing blind spot sensing system technology, a scheme that etches the specific mark on the reflection surface of the side mirror, that is, the mirror surface by a laser and makes light incident from a rear surface is used. This specific mark does not disappear when it is not flashing however and occupies a part of the mirror surface thereby reducing the viewable area in the mirror. As such, the visibility of the driver for a rear vehicle deteriorates.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art and to provide a planar lighting mirror in which nano-patterns are formed on the entirety or at a specific local area of a mirror surface of a mirror glass and a light source is disposed around the nano-patterns to be used like a mirror during normal operation. In particular, when the light source is lighted, the entirety or the specific local area of the mirror surface with the nano-patterns formed therein is planarly emitted with light from the light source which flows into the side of the mirror glass so as not to deteriorate the mirrors reflective imaging functions.

In one aspect, the present invention provides a planar lighting mirror including: a planar lighting glass with nano-patterns formed on an entire surface or a specific local surface thereof; a light source disposed on a side of the planar lighting glass to irradiate light onto the side of the planar lighting glass; and a metal coated layer disposed on one surface of the planar lighting glass to reflect the light from the light source to a non-coating surface of the planar lighting glass.

In particular, in one preferred embodiment, the nano-patterns may have a smaller size than a wavelength of visible-rays. These nano-patterns may also be directly formed on the surface of the planar lighting glass through masking and etching processes or indirectly formed by coating a film having the nano-patterns on the surface of a glass.

In another preferred embodiment, in the state where the light of the light source is excluded, on a surface of the planar lighting glass with the nano-patterns, visible-rays transmittance may be controlled to 85 to 99%. Additionally, the light source may be a light emitting diode (LED), a laser diode (LD), or a cold cathode fluorescent lamp (CCFL). As for disposition, the light source may be formed by disposing a plurality of light sources emitting different colors on a side of the planar lighting glass in order to show various emission colors.

In still yet another embodiment, the metal coated layer may be coated on one surface with the nano-patterns or the other surface without the nano-patterns of the planar lighting glass.

In another aspect, the present invention provides an automobile side mirror system using a planar lighting mirror, in which the planar lighting mirror including a planar lighting glass with nano-patterns formed on an entire surface or a specific local surface thereof, a light source disposed on the side of the planar lighting glass to irradiate to light onto the side of the planar lighting glass, and a metal coated layer coated on one surface of the planar lighting glass to reflect the light from the light source to a non-coating surface of the planar lighting glass is mounted inside and outside an automobile side mirror used as an indicator of a blind spot detection (BSD) system.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
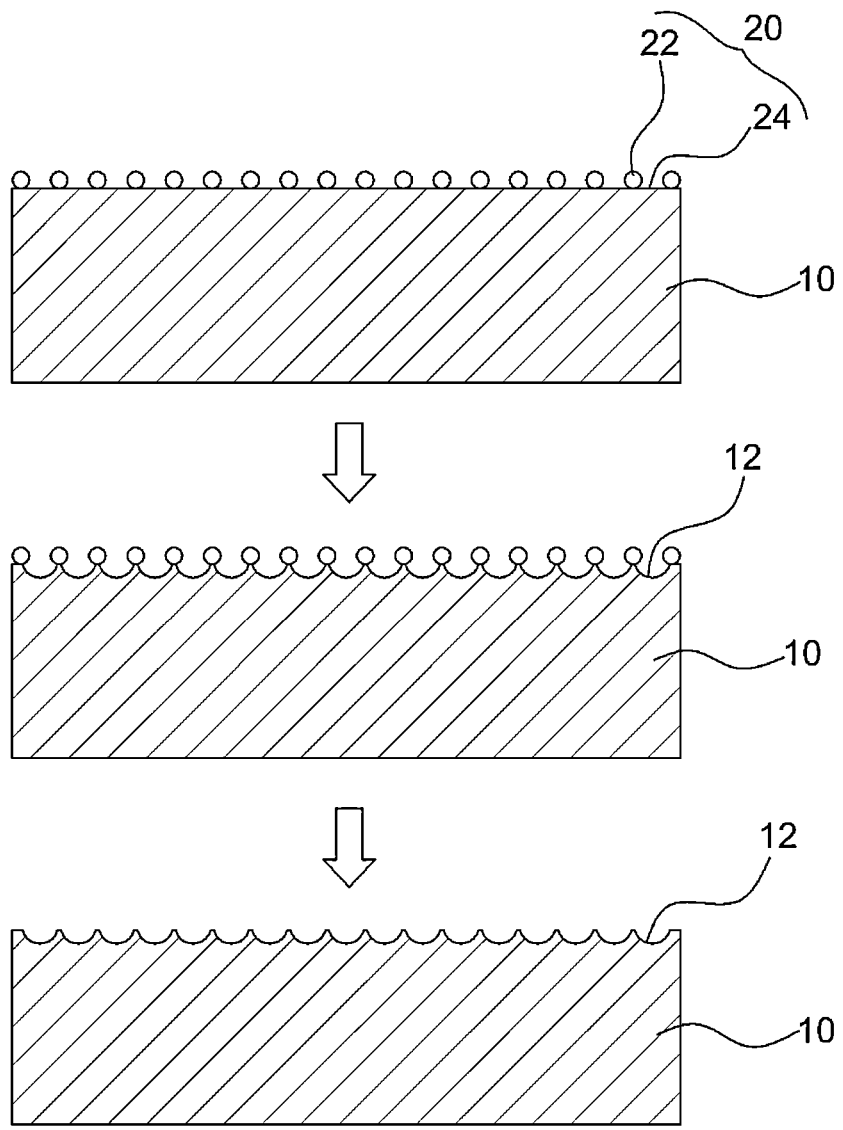
FIG. 1 is a schematic cross-sectional view illustrating one example of a method for forming nano-patterns on a planar lighting mirror according to the exemplary embodiment of the present invention.

Reference numerals set forth in the Drawings includes reference to the following elements as further discussed below:

| | |
|---|---|
| 10: Planar light glass | 12: Nano-patterns |
| 14: Metal coated layer | 16: Light source |
| 20: Mask | 22: Nano-particles |
| 24: Opening | 30: Side mirror |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention has been made in an effort to provide a planar lighting mirror that forms a nano structure which is smaller than a wavelength of visible rays on one surface of transparent planar lighting glass and coats a metallic layer for forming a mirror on the other one surface. As a result, only a part with nano-patterns is planarly lighted by light which flows from the side of the glass to be effectively used in automobiles, architectures, interiors, and advertisement fields.

In particular, the exemplary embodiment of the present invention provides a planar lighting mirror that is applied to a blind spot detection (BSD) system for the automobile side mirror to that detect when a vehicle and the like are present in a blind spot of a vehicle. The exemplary embodiment of the present invention uses the planar lighting mirror as an indication mirror that notifies the driver. To this end, first, nano-patterns for lighting are formed on an entire surface or a specific local surface of a transparent glass. As such, a planar lighting glass is provided for planar lighting.

Figure 2:
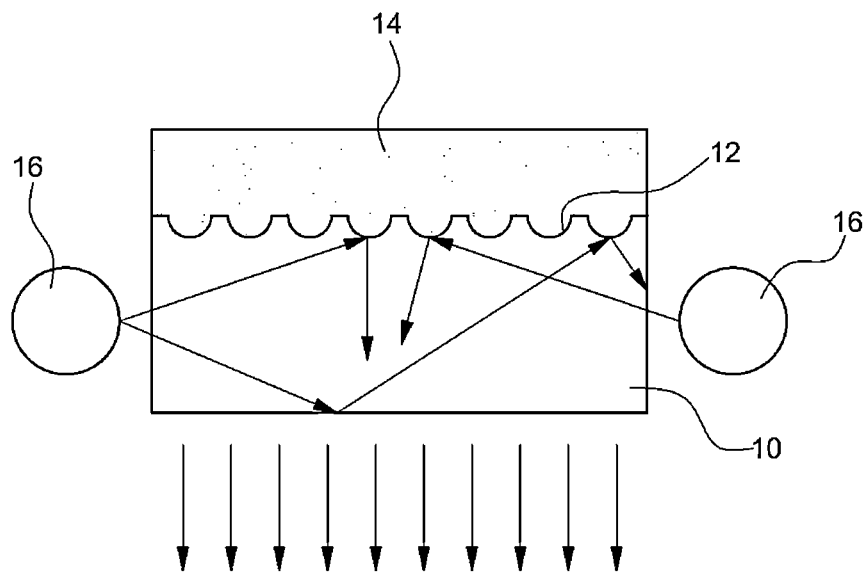
FIGS. 2 and 3 are configuration diagrams illustrating a planar lighting mirror according to the exemplary embodiment of the present invention.
Figure 3:
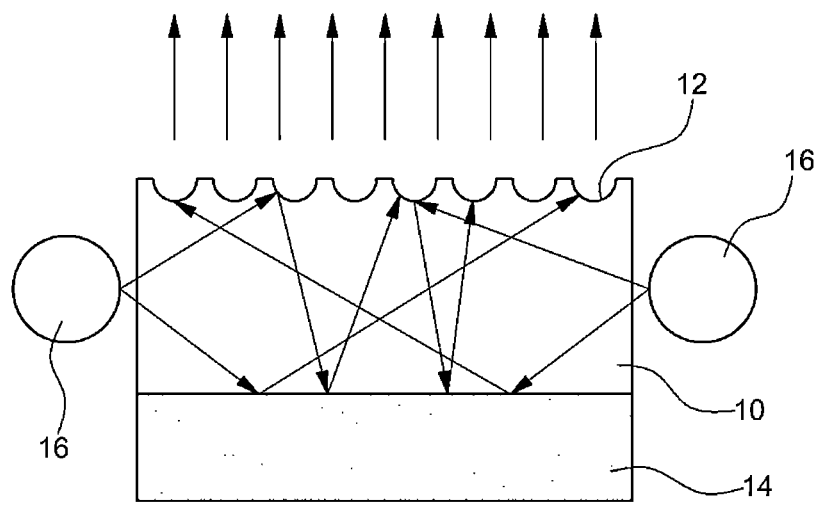

FIG. 1 is a schematic cross-sectional view illustrating one example of a method for forming nano-patterns on a planar lighting mirror according to the present invention. FIGS. 2 and 3 are configuration diagrams illustrating a planar lighting mirror according to the present invention.

In FIGS. 1 to 3, reference numeral 10 represents planar lighting glass. Nano-patterns 12, having a smaller size than a wavelength of visible-rays, are formed on the entirety of one surface or at a specific local portion of one surface of the planar lighting glass 10. In this case, the nano-patterns 12 are directly formed on the surface of the planar lighting glass 10 through masking and/or etching processes and are formed by specific characters, character strings, figures, images, and the like.

In more detail, a mask 20 with nano particles 22 and openings 24 formed among the nano particles is attached to a glass surface and thereafter, the surface of the planar lighting glass 10 exposed through the openings 24 is etched. As a result, the nano-patterns 12 are directly formed on the entirety or at a local portion of one surface of the planar lighting glass 10.

For example, the surface of the planar lighting glass 10 may be etched by a chemical dry etch method that provides hydrofluoric acid (HF) steam to the planar lighting glass 10 through the openings 24, and as a result, the nano-patterns 12 are directly formed on the entirety or at the local portion of one surface of the planar lighting glass 10. Alternatively, the nano-patterns 12 may be formed by an indirect scheme in which a film with the nano-patterns may be attached to the surface of the planar lighting glass 10.

After the nano-patterns 12 are formed on the planar lighting glass 10, the mask 20 may be removed through wet etching, and as a result, the nano-patterns 12 may remain on the surface of the glass 10. Next, a metal coated layer 14 is formed on one surface or the other surface of the planar lighting glass 10 with the nano-patterns 12.

In particular, the metal coated layer 14 is coated on one surface so that the planar lighting glass becomes the mirror and the metal coated layer 14 is coated on one surface with the nano-patterns 12 of the planar lighting glass 10 or the other surface without the nano-patterns. Meanwhile, since it is difficult to distinguish visible-rays transmittance when comparing the surface with the nano-patterns of the planar lighting glass with the surface without the nano-patterns thereof, a mirror function which is the same as a function of a conventional mirror is present when light is not being emitted.

Preferably, the surface with the nano-patterns of the planar lighting glass allows visible-ray transmittance to be controlled to about 85 to 99%. Therefore, in the part of the planar lighting glass with the nano-patterns the visible-ray transmittance is further increased as compared with the surface without the nano-patterns. This provides an anti-reflection effect. This effect is known as a moth eye effect.

According to the present invention, a light source 16 that irradiates light to the nano-patterns 12 through the side of the planar lighting glass 10 is disposed on the side of the planar lighting glass 10 so that the nano-patterns 12 of the planar lighting glass 10 emit light. As the light source 16, a light emitting diode (LED), a laser diode (LD), or a cold cathode fluorescent lamp (CCFL) may be used. However other illumination means may be used in place of the above light sources without departing from the spirit of the present invention.

Preferably, a plurality of light sources that emit different colors in the part with the nano-patterns may be disposed on the side of the planar lighting glass. An emission operation of the planar lighting mirror according to the present invention completed as described above will be described below.

Referring to FIG. 2, when the planar lighting mirror in which the metal coated layer 14 is formed on the surface of the nano-patterns of the planar lighting glass 10 and current is applied to the light source 16 to allow light of the light source 16 to flow into the internal nano-patterns 12 on the side of the planar lighting glass 10, the light is reflected on the metal coated layer 14 and is thus emitted through an opposite surface (e.g., a surface where the nano pattern is not formed and which is not coated with the metal coated layer) of the planar lighting glass through the nano-patterns 12 that serve as a lens. As a result, the emitted light may be viewed only in the part of the mirror that have the nano-patterns formed thereon.

Referring to FIG. 3, when the planar lighting mirror in which the metal coated layer 14 is formed on the surface of the planar lighting glass 10 without the nano-patterns and current is applied to the light source 16 to allow light of the light source 16 to flow into the internal nano-patterns 12 on the side of the planar lighting glass 10, the light is reflected on the metal coated layer 14 and is thus emitted through an opposite surface (e.g., a surface which is not coated with the metal coated layer) of the planar lighting glass through the nano-patterns 12 that serve as the lens. As a result, the light may be emitted only in the part of the mirror with the nano-patterns formed therein.

As the exemplary embodiment of the present invention, the planar lighting mirror of the present invention may be applied to the automobile side mirror as the indicator for the blind spot detection (BSD) system. To this end, a planar lighting mirror having a planar lighting glass 10 with a nano-patterns 12 formed on an entire surface or a specific local surface thereof, a light source 16 disposed on a side of the planar lighting glass 10 to irradiate light onto the side of the planar lighting glass 10, and a metal coated layer 14 coated on one surface of the planar lighting glass 10 to reflect light from the light source 16 to a non-coating surface of the planar lighting glass 10 is mounted inside and outside the automobile side mirror.

Figure 4:
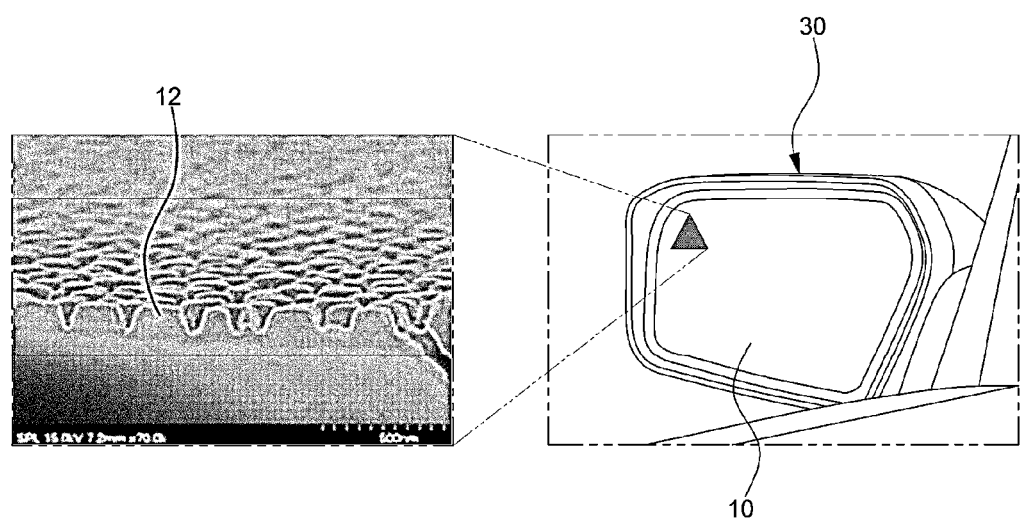
FIG. 4 is a perspective view illustrating an example in which the planar lighting mirror is applied to an automobile side mirror according to the exemplary embodiment of the present invention.

That is, as illustrated in FIG. 4, the planar lighting glass 10 is mounted as a reflection mirror of the side mirror 30 and the light source 16 is mounted (in a non-visible location) in a body part of the side mirror, and as a result, the part with the nano-patterns 12 of the planar lighting glass 10 may be used as the indicator of the blind spot detection (BSD) system. Accordingly, when power is applied to the light source 16, since only the part (a triangular figure in FIG. 4) of the mirror with the nano-patterns emits light while the light of the light source is emitting/irradiating to the nano-patterns, safe driving may be achieved by allowing a driver to safely verify and easily recognize that the vehicle or object is present in the blind spot.

Through the aforementioned problem solving means, the present invention provides the following advantageous effects.

First, a planar lighting mirror can be provided, in which a nano structure which is smaller than a wavelength of visible-rays is formed on one surface of a transparent glass and a metallic layer is coated on the other one surface so that planar lighting occurs in a part with nano-patterns by light that flows from the side of the glass and the planar lighting mirror can be effectively applied and used in automobile, architectural, interior, and advertisement fields. In particular, the planar lighting mirror can be usefully used as an indicator of a blind spot detection (BSD) system of an automobile side mirror.

Second, since a difference in visible-rays transmittance between the part with the nano-patterns and the part without the nano-patterns of the planar lighting mirror is controlled within approximately 10%, the planar lighting mirror can also perform a mirror function as a general mirror without loss of the visible-rays transmittance when the part with the nano-patterns is not emitting light.

Third, since the light source makes light flow into the side of the planar lighting mirror glass, respective light sources including white, red, green, and blue can be used or light of a mixture color can flow by binding all of the light sources as one set, emission light having various colors can be provided.

Fourth, characters, character strings, figures, images, and the like having specific meanings can formed in the area within the nano-patterns and light of a side light source is incident only in a desired position to emit and display various pieces of information and various images depending on various situations.

Fifth, fade-outs or animations, or the like having various colors may be implemented on the mirror surface by controlling applied voltage or applied current when light sources emit light.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A planar lighting mirror for an automobile side mirror, comprising:
   a planar lighting glass with nano-patterns formed directly on an entire surface or a specific local surface of the planar lighting glass;
   a light source disposed on a side of the planar lighting glass to irradiate light onto the side of the planar lighting glass; and
   a metal coated layer coated on one surface of the planar lighting glass to reflect the light from the light source to a non-coating surface of the planar lighting glass.

2. The planar lighting mirror of claim 1, wherein the nano-patterns have a smaller size than a wavelength of visible-rays.

3. The planar lighting mirror of claim 1, wherein the nano-patterns are directly formed on the surface of the planar lighting glass through masking and etching processes or indirectly formed by coating the glass surface with a film having nano-patterns.

4. The planar lighting mirror of claim 1, wherein when the light of the light source is not being irradiated onto the side of the planar lighting glass, visible-rays transmittance is 85% to 99%.

5. The planar lighting mirror of claim 1, wherein the light source is selected from a group consisting of a light emitting diode (LED), a laser diode (LD), and a cold cathode fluorescent lamp (CCFL).

6. The planar lighting mirror of claim 1, wherein the light source is a plurality of light sources emitting different colors in order to show various emission colors disposed on the side of the planar lighting glass.

7. The planar lighting mirror of claim 1, wherein the metal coated layer is coated on one surface with the nano-patterns or the other surface without the nano-patterns of the planar lighting glass.

8. An automobile side mirror system comprising:
a planar lighting mirror having:
a planar lighting glass with nano-patterns formed on an entire surface or a specific local surface,
a light source disposed on a side of the planar lighting glass to irradiate light onto the side of the planar lighting glass, and
a metal coated layer coated on one surface of the planar lighting glass to reflect the light from the light source to a non-coating surface of the planar lighting glass, wherein the planar lighting mirror is mounted inside and outside an automobile side mirror;
an indicator for a blind spot detection (BSD) system nano patterns formed in the planar lighting mirror.

9. The planar lighting mirror of claim 1, wherein the nano-patterns are an indicator for a blind spot detection (BSD) system of the automobile side mirror when the light source irradiates light onto the side of the planar lighting glass.

* * * * *